United States Patent
Fukuhisa et al.

(10) Patent No.: US 7,085,087 B2
(45) Date of Patent: Aug. 1, 2006

(54) DATA STORAGE APPARATUS AND METHOD FOR MANAGING BUFFER MEMORY

(75) Inventors: Ryoji Fukuhisa, Machida (JP); Hirofumi Saitoh, Kanagawa (JP); Takahiro Saito, Yokohama (JP); Shuji Yamada, Fujisawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 178 days.

(21) Appl. No.: 10/713,289

(22) Filed: Nov. 14, 2003

(65) Prior Publication Data

US 2004/0103245 A1 May 27, 2004

(30) Foreign Application Priority Data

Nov. 21, 2002 (JP) ............................. 2002-338497

(51) Int. Cl.
*G11B 5/02* (2006.01)
(52) U.S. Cl. ...................................................... 360/55
(58) Field of Classification Search ................ 360/55, 360/5; 369/30.23; 365/189.04; 711/112; 710/52, 56, 60, 106; 713/401; 714/719, 714/401; 709/221, 226, 213, 236; 345/505; 358/473, 444; 382/163
See application file for complete search history.

(56) References Cited

U.S. PATENT DOCUMENTS

| | | | | |
|---|---|---|---|---|
| 4,449,182 A | * | 5/1984 | Rubinson et al. ............. 710/60 |
| 5,014,329 A | * | 5/1991 | Rudak ........................ 382/163 |
| 5,293,273 A | * | 3/1994 | Glick ............................ 360/5 |
| 5,363,001 A | * | 11/1994 | Vinal ......................... 327/55 |
| 5,365,483 A | * | 11/1994 | Vinal ......................... 365/203 |
| 5,490,145 A | * | 2/1996 | Tanabe et al. ............... 370/452 |
| 5,548,728 A | * | 8/1996 | Danknick .................... 709/213 |
| 5,557,783 A | * | 9/1996 | Oktay et al. ................. 713/401 |
| 5,602,956 A | * | 2/1997 | Suzuki et al. ................. 386/68 |
| 5,606,671 A | * | 2/1997 | Wadsworth et al. ......... 710/106 |
| 5,613,096 A | * | 3/1997 | Danknick .................... 709/236 |
| 5,701,411 A | * | 12/1997 | Tran et al. ................... 709/250 |
| 5,777,755 A | * | 7/1998 | Aoki et al. .................. 358/444 |
| 5,896,322 A | * | 4/1999 | Ishii ....................... 365/189.04 |
| 5,948,082 A | * | 9/1999 | Ichikawa ...................... 710/52 |
| 6,023,727 A | * | 2/2000 | Barrett et al. ................ 709/221 |
| 6,052,312 A | * | 4/2000 | Ishii ....................... 365/189.04 |
| 6,078,988 A | * | 6/2000 | Komori ....................... 711/112 |

(Continued)

FOREIGN PATENT DOCUMENTS

JP 2002-170319 6/2002

(Continued)

*Primary Examiner*—David Hudspeth
*Assistant Examiner*—Fred F. Tzeng
(74) *Attorney, Agent, or Firm*—Bracewell & Giuliani LLP

(57) ABSTRACT

To avoid degradation of performance of a storage apparatus even when access biased to writing or reading of data is performed in a buffer memory that adopts a dual ring buffer system as a data structure. A sector buffer for caching an access request is provided in a DRAM of the storage apparatus. The sector buffer has a first ring buffer (BUF_W) that temporarily holds an external write request for a recording medium in advance of its process to the recording medium, and a second ring buffer (BUF_R) that retains data read from the recording medium according to an external read request for the recording medium. An MPU of the storage apparatus shifts a BPAGE of the BUF_R or BUF_W according to external access patterns to the recording medium to thereby change the buffer sizes of the BUF_R and BUF_W.

12 Claims, 5 Drawing Sheets

U.S. PATENT DOCUMENTS

| | | | |
|---|---|---|---|
| 6,112,267 A * | 8/2000 | McCormack et al. | 710/52 |
| 6,249,359 B1 * | 6/2001 | Aoki et al. | 358/473 |
| 6,408,409 B1 * | 6/2002 | Williams et al. | 714/719 |
| 6,708,213 B1 * | 3/2004 | Bommaiah et al. | 709/226 |
| 6,725,298 B1 * | 4/2004 | Hiratani | 710/56 |
| 6,804,178 B1 * | 10/2004 | Tada et al. | 369/30.23 |
| 6,885,374 B1 * | 4/2005 | Doyle et al. | 345/505 |

FOREIGN PATENT DOCUMENTS

| | | |
|---|---|---|
| JP | 2002-259115 | 9/2002 |

\* cited by examiner

DATA STORAGE APPARATUS AND METHOD FOR MANAGING BUFFER MEMORY

RELATED PATENT APPLICATION

This application claims priority to Japanese Patent Application No. JP2002-338497 (Hitachi Global Storage Technologies Docket No. JP920020204US 1), filed on Nov. 21, 2002, and entitled "Data Storage Apparatus and Method for Managing Buffer Memory".

BACKGROUND OF THE INVENTION

1. Technical Field

The present invention relates to a data storage apparatus, and particularly to control of a buffer memory that temporarily retains data therein when the data is read from and written in a recording medium such as a magnetic disk.

2. Description of the Related Art

In an external storage apparatus of a computer, including a magnetic disk apparatus (hard disk drive), a buffer memory (DRAM: Dynamic Random Access Memory) called a sector buffer is prepared as means for improving the performance of a data read/write process. Caching (retaining) of a data write request (including write data) sent from a host system or once-read data has conventionally been performed.

A data structure called a ring buffer is generally used for the sector buffer. The ring buffer is a technique for coupling the beginning and end of a buffer and thereby handling a finite-length buffer as an infinite-length one (see Patent Documents 1 and 2, for example).

FIG. 5 is a conceptual diagram showing the configuration of a ring buffer. As shown in FIG. 5, the ring buffer manages an aggregation significant as continuous data as a segment while using a memory area of each sector buffer in order from a buffer bottom thereof to a buffer top thereof. After the sector buffer has been used up to the buffer top, the ring buffer returns to the buffer bottom, where the use of the sector buffer is continued. Thus, a ring is semantically (logically) formed.

Since the sector buffer is used in order, the above-described ring buffer system is suitable for use in a command processing format for processing commands in turn. On the other hand, command's reordering or the like has been performed to further improve the performance of a data read/write process in these days. The reordering is to reorder an execution sequence of commands for reading and writing data in such a manner that the waiting time required up to the execution of writing or reading of the data becomes the shortest. Suitably rearranging the processing sequence of commands by reordering or the like and executing the commands will cause complexity of segment management of the segment buffer in the form of a write request and read data being mixed.

SUMMARY OF THE INVENTION

Although the ring buffer system is suitable for the command processing format for processing the commands in order as described above, it complicates the segment management of the sector buffer in the mixed form of the write request and read data where the processing order of the commands is suitably reordered, followed by execution of the commands.

In order to solve this problem, a system can be conceived wherein a data write request and read data are separately handled in a sector buffer. That is, this system is that a ring buffer for caching the write request and another ring buffer for caching the read data are provided in the sector buffer, and segments in the two ring buffers are individually managed. This system is hereinafter called a dual ring buffer system. Managing the write request and read data individually makes it possible to avoid complexity of segment management in the sector buffer even where commands related to data reading and writing are suitably reordered and executed.

Since, however, the two ring buffers are provided in the sector buffer in this case, individual buffer sizes used for caching the write request and read data are reduced. More specifically, since the contents to be cached is not limited in a normal ring buffer (hereinafter called a single ring buffer system), many write requests are cached if access for writing data into an external storage apparatus increases, whereas if access for reading data increases, then read data is much cached. In other words, when the access is biased to the data writing or reading, the write request or read data corresponding to the memory capacity of the sector buffer at the maximum can be cached. On the other hand, since the write request ring buffer and the read data ring buffer are separated from each other in the dual ring buffer system, the dual ring buffer system can cache only the buffer sizes allocated to the respective ring buffers.

In general, in a cache system, large memory capacity of a cache memory (buffer memory) is capable of contributing to an improvement in performance. Thus, when access biased to writing or reading of data exists, such an external storage apparatus that a dual ring buffer system is employed in a sector buffer, is degraded in performance as compared with the external storage apparatus that adopts the single ring buffer system.

While, today, data to be handled by a computer are brought into a multimedia form, and a hard disk recorder for recording motion pictures and voice on a magnetic disk is becoming pervasive, there is also an increasing opportunity to perform such biased access that large size data such as image data, voice data or the like is written or read at a time.

It is therefore an object of the present invention to avoid degradation of performance of a storage apparatus even in the case of execution of access biased to writing or reading of data by adopting a dual ring buffer system as a data structure of a buffer memory.

In order to achieve the above object, the present invention is implemented as a data storage apparatus configured in the following manner. That is, the data storage apparatus comprises a recording medium that records data, buffer means having a first ring buffer that temporarily retains an external write request to the recording medium prior to a process on the recording medium, and a second ring buffer that retains data read from the recording medium according to an external read request to the recording medium, and buffer control means that changes the respective buffer sizes of the first ring buffer and the second ring buffer included in the buffer means according to external access patterns to the recording medium.

More preferably, the buffer means comprises a RAM (Random Access Memory) in which a buffer area is divided into the first ring buffer and the second ring buffer. The position of a bottom page of the first ring buffer or the position of a bottom page of the second ring buffer is changed to vary the respective buffer sizes of the first and second ring buffers.

The buffer sizes can be changed based on the type of each access request accepted from outside and frequency of access requests for each type or based on the size of write data or read data related to an access request accepted from outside.

Further, the present invention is implemented also as a method of managing a buffer memory that temporarily retains data prior to reading and writing of the data from and on a recording medium. The buffer memory management method comprises the steps of analyzing an external access request to the recording medium, determining based on the result of analysis whether the respective buffer sizes of a write request ring buffer and a read data ring buffer provided in a buffer area of the buffer memory should be changed, and changing the position of a partition for dividing the buffer area of the buffer memory into the two ring buffers according to the determination to thereby change the respective buffer sizes of the two ring buffers.

More specifically, the buffer sizes are changed in such a manner that the write request ring buffer is expanded when the number of write requests increases in the external access request, and the buffer sizes are changed in such a manner that the read data ring buffer is expanded when the number of read requests increases in the external access request. Alternatively, the buffer sizes are changed in such a manner that the write request ring buffer is expanded when the number of access requests for writing large size data increases in the external access request, and the buffer sizes are changed in such a manner that the read data ring buffer is expanded when the number of access requests for reading large size data increases in the external access request.

Further, the present invention for achieving the above object is implemented as a magnetic disk apparatus configured as follows: The magnetic disk apparatus comprises a magnetic disk that magnetically records data, and a buffer memory that temporarily retains data read from and written on the magnetic disk in advance of a process on the magnetic disk, wherein the buffer memory includes a memory area divided into a first ring buffer that stores a write request accepted from outside, to the magnetic disk, and a second ring buffer that stores data read from the magnetic disk, and the position of a partition for separating the first ring buffer from the second ring buffer is changed to vary the respective buffer sizes of a write area and a read area.

Furthermore, the present invention is implemented also as a hard disk recorder for recording and reproducing a multimedia content by use of a magnetic disk as a recording medium. The hard disk recorder is configured such that it comprises buffer means having a first ring buffer that temporarily retains a write request to the magnetic disk in advance of a process on the magnetic disk, and a second ring buffer that retains data read from the magnetic disk according to a read request to the magnetic disk, and buffer control means that dynamically allocates a memory area of the buffer means in such a way as to give a large buffer size to the first ring buffer when the hard disk recorder is operating in an operation mode for recording the multimedia content and to give a large buffer size to the second ring buffer when the hard disk recorder is operating in an operation mode for reproducing the multimedia content.

DETAILED DESCRIPTION OF THE INVENTION

The present invention will hereinafter be described in detail based on an embodiment illustrated in the accompanying drawings. In the present embodiment, a hard disk drive using a magnetic disk as a recording medium will be explained as an external storage apparatus by way of example.

Figure 1:
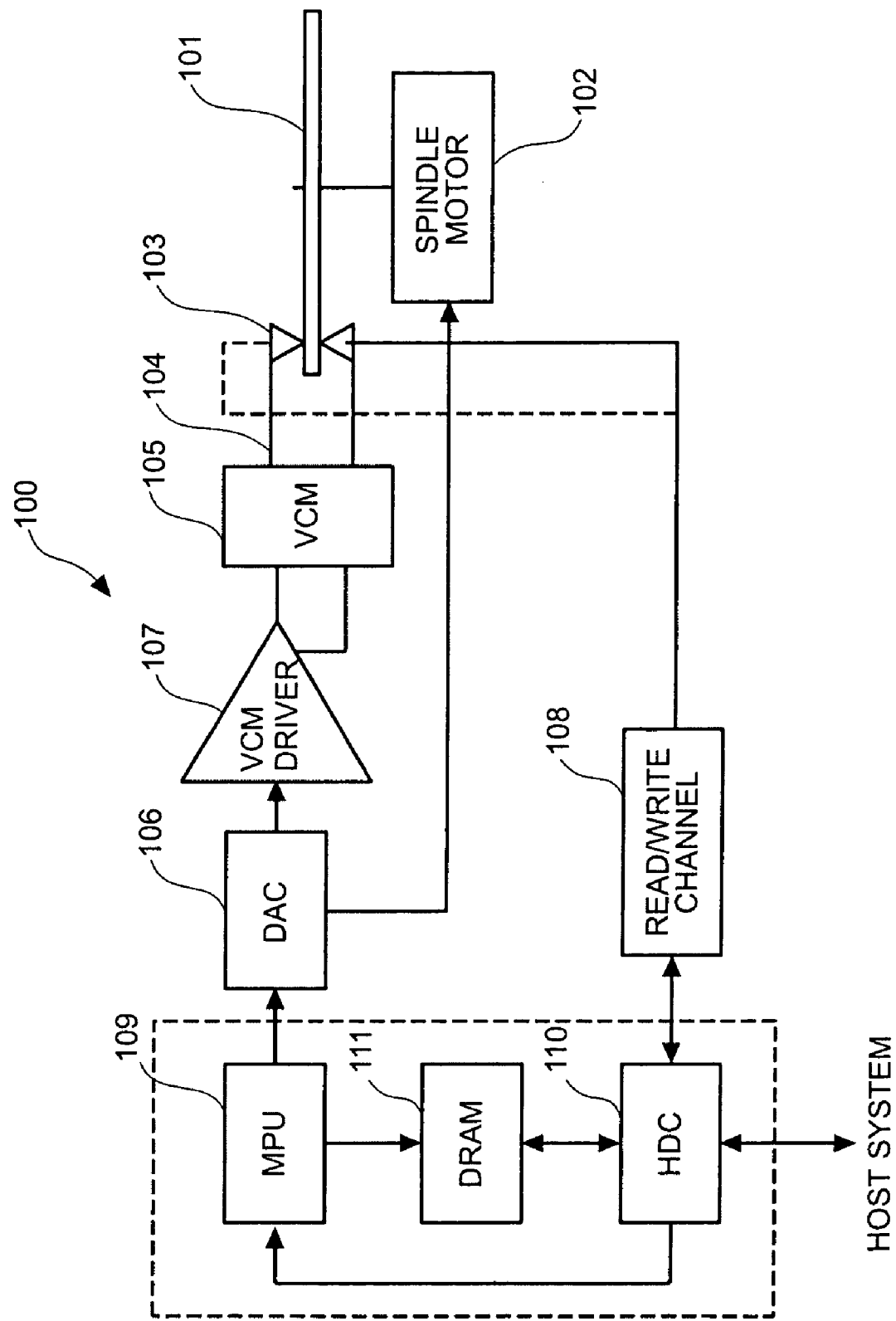
FIG. 1 is a block diagram showing a main configuration of a hard disk drive according to the present embodiment.

FIG. 1 is a block diagram showing a configuration of a main part of a hard disk drive 100. The hard disk drive 100 is an external storage apparatus wherein each of magnetic heads 103 seeks over a magnetic disk 101 rotatably driven by a spindle motor 102 and writes data on the magnetic disk 101 while staying on a predetermined track (at a predetermined position), or reads the data written onto the magnetic disk 101. The magnetic disk 101 is a recording medium for recording data as magnetic information and mounted therein in a singular or plural form as needed. However, a singular example is illustrated in FIG. 1.

While the hard disk drive 100 is in operation, the magnetic disk 101 continues to be driven to rotate around the spindle shaft of the spindle motor 102. While the hard disk drive 100 is not in operation, the magnetic disk 101 stops rotating (at rest). Two magnetic heads 102 are held at the front end of the actuator 104 and act respectively on the top and bottom surfaces of the magnetic disk 101. They implement data write and read to and from the magnetic disk 101. The actuator 104 is driven by a voice coil motor (VCM) 105 controlled by an MPU (Micro Processing Unit) 109 through a digital/analog converter (DAC) 106 and a voice coil motor (VCM) driver 107.

A read/write channel 108 executes a data read/write process. That is, when writing data, the read/write channel 108 converts write data transferred from a host system (computer) through an HDC (Hard Disk Controller) 110 into a write signal (current) and supplies it to the magnetic heads 103. The magnetic heads 103 execute writing of data on the magnetic disk 101 based on the write current. On the other hand, when reading data, the read/write channel 108 converts a read signal (current) read from the magnetic disk 101 into digital data and outputs it to the host system through the HDC 110.

The HDC 110 has functions used as interfaces of the hard disk drive 100. One of the functions is to receive the write data transferred from the host system and transfer it to the read/write channel 108. Another function is to transfer the read data transferred from the read/write channel 108 to the host system. Yet another function is to transfer it to the MPU 109 in response to an instruction command or the like issued from the host system.

The MPU 109 controls the hard disk drive 100. A DRAM 111 is used to store a control program for allowing the MPU 109 to control the hard disk drive 100 and used as a sector buffer (buffer memory) for reading/writing data. Accordingly, the HDC 110 temporarily caches a write request (including write data) transferred from the host system in the DRAM 111, and at this time, issues a completion notice (command complete) to the write request to the host system for notification. Thereafter, the HDC 110 transfers the cached write data to the read/write channel 108 with suitable timing and executes the write request. Also the HDC 110 caches the read data transferred from the host system in the DRAM 111. When the HDC 110 receives a read request corresponding to the same data from the host system, it sends back the data cached in the DRAM 111 to the host system.

Figure 2:
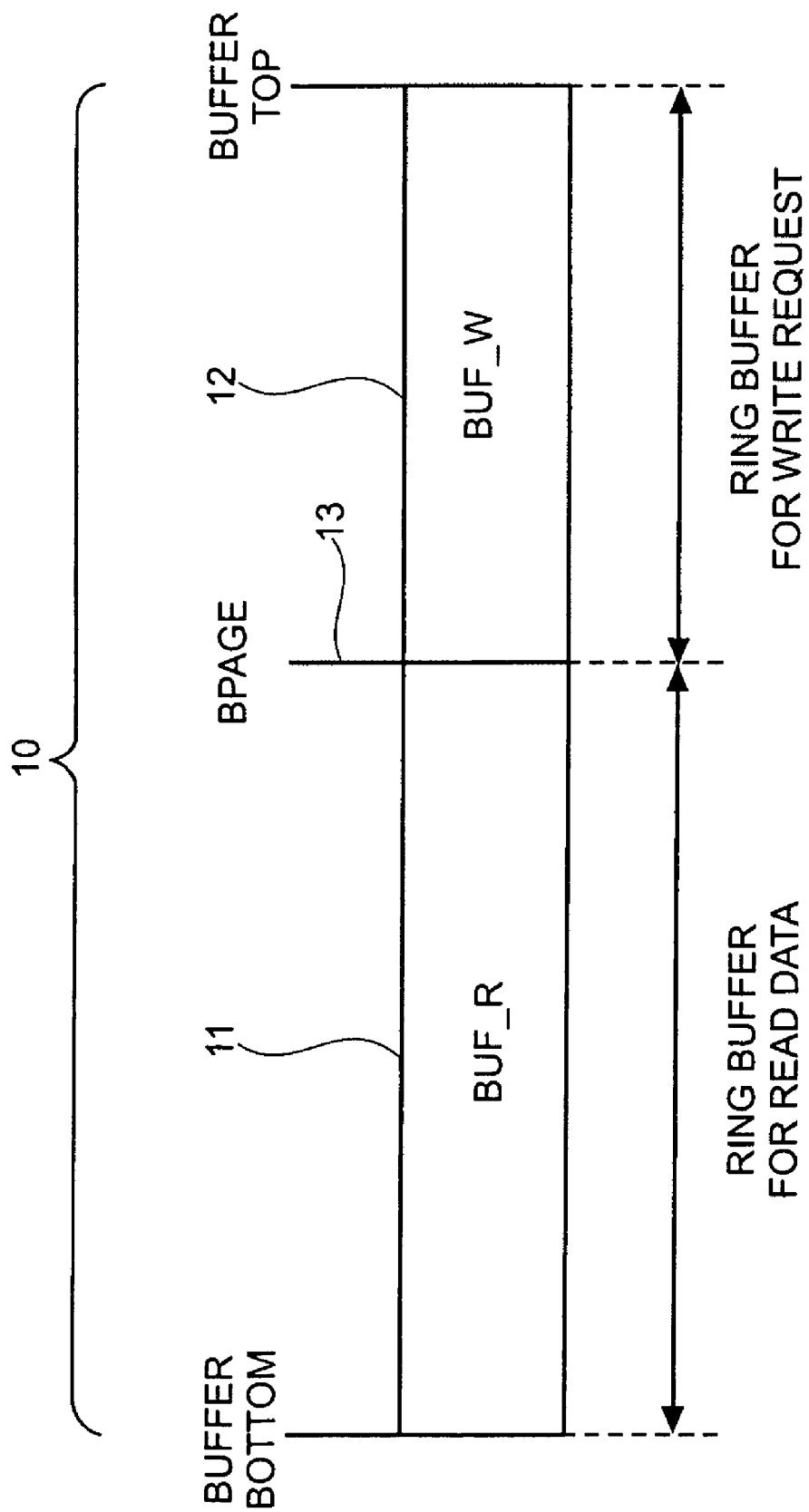
FIG. 2 is a diagram showing a configuration example of a sector buffer provided in a DRAM according to the present embodiment.

FIG. 2 is a diagram showing a configuration example of the sector buffer provided in the DRAM 111. As shown in FIG. 2, the sector buffer 10 according to the present embodiment adopts a dual ring buffer system as a data structure. The interior of the sector buffer is divided into a ring buffer (hereinafter called BUF_R) 11 corresponding to an area for read data, and a ring buffer (hereinafter called BUF_W) 12 corresponding to an area for a write request. In the illustrated example, a bottom page (hereinafter called BPAGE) 13 of the BUF_W 12 is used as a partition between the BUF_R 11 and the BUF_W 12. That is, an area from the buffer bottom to the BPAGE 13 of the sector buffer is used as the BUR-R 11, whereas an area from the buffer top to the BPAGE 13 of the sector buffer is used as the BUF-W 12. Incidentally, it is needless to say that while the bottom page of the BUF_W 12 is set as the partition (BPAGE 13) in the illustrated example, the bottom page of the BUF_R 11 is used as the partition (BPAGE 13) where the BUF_R 11 exists on the buffer top side and the BUF_W 12 exists on the buffer bottom side.

In the present embodiment, the position of the BPAGE 13 can be changed under the control of the MPU 109. More specifically, in the present embodiment, the MPU 109 is a control means for dynamically and suitably allocating a memory area of the whole sector buffer 10 to the BUF_R 11 and BUF_W 12 according to access patterns from the host system to the hard disk drive 100 (magnetic disk 101). The access patterns are patterns such as the frequency of write and read requests, and the sizes of data to be handled.

Figure 3:
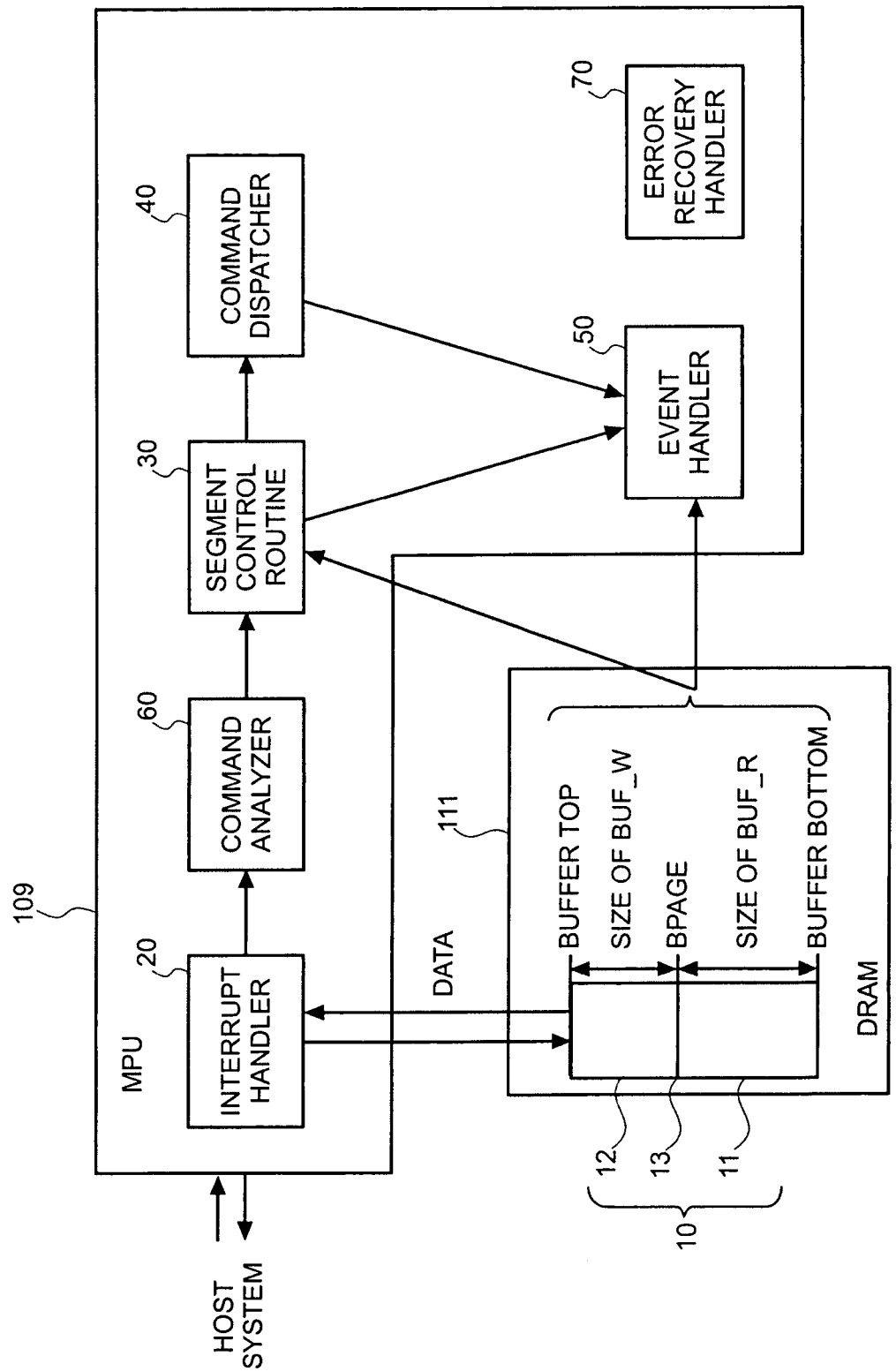
FIG. 3 is a block diagram showing functions of an MPU used as a control means of the sector buffer according to the present embodiment.

FIG. 3 is a block diagram showing functions of the MPU 109 used as the control means of the sector buffer 10. Referring to FIG. 3, the MPU 109 according to the present embodiment includes an interrupt handler 20 that accepts an access request (hereinafter called access command) sent from the host system, a segment control routine 30 that manages and controls segments of the sector buffer 10, a command dispatcher 40 that issues a command for changing the constitution of the sector buffer 10, and an event handler 50. In addition, the MPU 109 includes a command analyzer 60 and an error recovery handler 70. The command analyzer 60 analyzes the access command and determines whether the BPAGE 13 of the sector buffer 10 should be shifted. In the event of a failure of the process using the sector buffer 10, the error recovery handler 70 detects it and performs retry.

These functions are executed by controlling the MPU 109 according to a program (micro code) stored in the DRAM 111. This program has been written on the magnetic disk 101, for example, and is transferred to the DRAM 111 upon startup of the hard disk drive 100.

In the above constitution, the interrupt handler 20 receives the access command given from the host system, which has been transferred from the HDC 110, and performs a process corresponding to the type of request (writing or reading of data). When the interrupt handler 20 has accepted a write request, it stores write data related to the write request in the sector buffer 10 and calls the segment control routine 30 to start processing. When, at this time, the sector buffer 10 has an allowance to be able to accept the next write request even if the next write request further comes in, the sector buffer 10 issues a write transfer complete to the interrupt handler 20. The interrupt handler 20 having received the write transfer complete therein sends back a command complete to the host system. When the interrupt handler 20 has accepted a data read request, it calls the segment control routine 30 to start processing.

The segment control routine 30 checks for the relation between the data stored in the sector buffer 10 and the access command accepted by the interrupt handler 20 and performs a process corresponding to the corresponding request. For instance, if data at the same address as a write destination of write data related to a write request is being held in the BUF_R 11 where the access command accepted by the interrupt handler 20 is of the write request, then the segment control routine 30 performs a process for discarding the data. If data related to a read request is being held (hit) in the BUF_R 11 or BUF_W 12 where the access command accepted by the interrupt handler 20 is of the read request, then the segment control routine 30 reads the data and transmits it to the host system. Since it is necessary to read the data from the magnetic disk 101 if the data related to the read request is not retained in the BUF_R 11 and BUF_W 12, the segment control routine 30 calls the command dispatcher 40.

Further, the segment control routine 30 of the present embodiment shifts the BPAGE 13 in the sector buffer 10 in a predetermined case. The details of its process will be described later.

The command dispatcher 40 issues instructions such as a seek for the magnetic head 103, generation of a management table, reading and writing of data, etc. with suitable timing. When the command dispatcher 40 is called from the segment control routine 30 to read data from the magnetic disk 101, the command dispatcher 40 immediately issues instructions for reading the data.

Further, the command dispatcher 40 of the present embodiment performs a process necessary to move the BPAGE 13 in the sector buffer 10 in the predetermined case. The details of its process will be described later.

The event handler 50 detects as events various instructions issued from the command dispatcher 40 and implements or executes the instructions to start up a suitable routine for reading and writing data from and on the magnetic disk 101. Thus, the data is actually written on or read from the magnetic disk 101.

The data read from the magnetic disk 101 is stored in the BUF_R 11 of the sector buffer 10 and transmitted to the host system. The command analyzer 60 analyzes each access command accepted by the interrupt handler 20 and makes a decision as to whether the BPAGE 13 should be shifted. As a method of analyzing the command and determining its shift, the following method can be adopted which is based on the type or frequency of the accepted access command.

(1) The command analyzer 60 analyzes the type of access command (read request or write request) and a command length (size of read or written data). When the predetermined number, or more, of read requests each having a fixed or longer command length are sent (specifically when three or more requests to read data each having a size exceeding 64 sectors are sent, for example), the command analyzer 60 determines that the BPAGE 13 is moved so as to expand the BUF_R 11 (the BPAGE 13 is moved to the buffer top side in the example of FIG. 2). When the write request comes in, the command analyzer 60 determines that the BPAGE 13 is moved so as to expand the BUF_W 12 (restore it).

(2) The command analyzer 60 analyzes the type of access command (read request or read request). The write requests are continuously cached and, when the free space for the BUF_W 12 is reduced to a small size, the command analyzer 60 judges the BUF_W 12 to be expanded (information about the free space of the BUF_W 12 can be obtained from the segment control routine 30). Incidentally, in this case, the size of the BUF_W 12 is initially set small.

(3) The command analyzer 60 analyzes the type of access command (read request or write request) and counts the respective numbers of read and write requests accepted separately from each other. If a predetermined or larger difference occurs in the count value, then the command analyzer 60 judges the BPAGE 13 to be moved according to the difference in such a manner that if the read request increase, then the BUF_R 11 is expanded, and if the write request increases, then the BUF_W 12 is expanded. In this case, a threshold value for determining to which side the BPAGE 13 should be moved according to how much difference occurs is set in advance and retained in the DRAM 111, for example.

In a modification of such a method, the command analyzer 60 may further analyze even each command length (size of read or written data) and determines, on a combined basis, the accepted number of read and write requests and their command lengths to thereby judge the BPAGE 13 to be moved.

The command analyzer 60 analyzes the type of access command (read request or write request). The command analyzer 60 calculates respective hit rates of data cached in the BUF_R 11 and BUF_W 12 and judges the BPAGE 13 to be moved in such a manner that they reach a more effective buffer size (a large size is allocated to one high in hit rate).

In addition to these, when the hard disk drive 100 is a hard disk recorder, other than a hard disk drive used as an external storage apparatus of a computer, for recording and reproducing multimedia contents such as motion data, voice data, etc., access patterns to a magnetic disk are much different from each other when the multimedia contents are recorded and reproduced. That is, when the multimedia contents are recorded, the number of requests for writing of large data increases, whereas when the multimedia contents are reproduced, the number of requests for reading of large data increases. Thus, it is also possible to monitor an operation mode of the hard disk drive 100 and control the hard disk drive 100 in such a manner that the BPAGE 13 is moved to increase the BUF_W 12 in recording operation and moved to increase the BUF_R 11 in reproducing operation.

After the command analyzer 60 has made a decision as to whether the BPAGE 13 should be moved, by using the above method, a check is made, based on the command issued from the command dispatcher 40, as to whether the state of the sector buffer 10 is a state in which the BPAGE 13 is movable. If it is found that the BPAGE 13 is movable, then the segment control routine 30 changes the position of the BPAGE 13. With regard to the movement of the BPAGE 13, the BPAGE 13 can be shifted on a stepwise basis by presetting the positions of the BPAGE 13 in such a manner that the BUF_R 11 and BUF_W 12 take predetermined rates in several stages.

Aside from a series of read/write processes executed by the interrupt handler 20 through the event handler 50, the error recovery handler 70 starts up when an error occurs in the read/write processes and re-executes a data write process or a data read process in accordance with a previously prepared error recovery procedure.

The operation of controlling the sector buffer 10 when the hard disk drive 100 has received each access command from the host system will next be explained.

Figure 4:
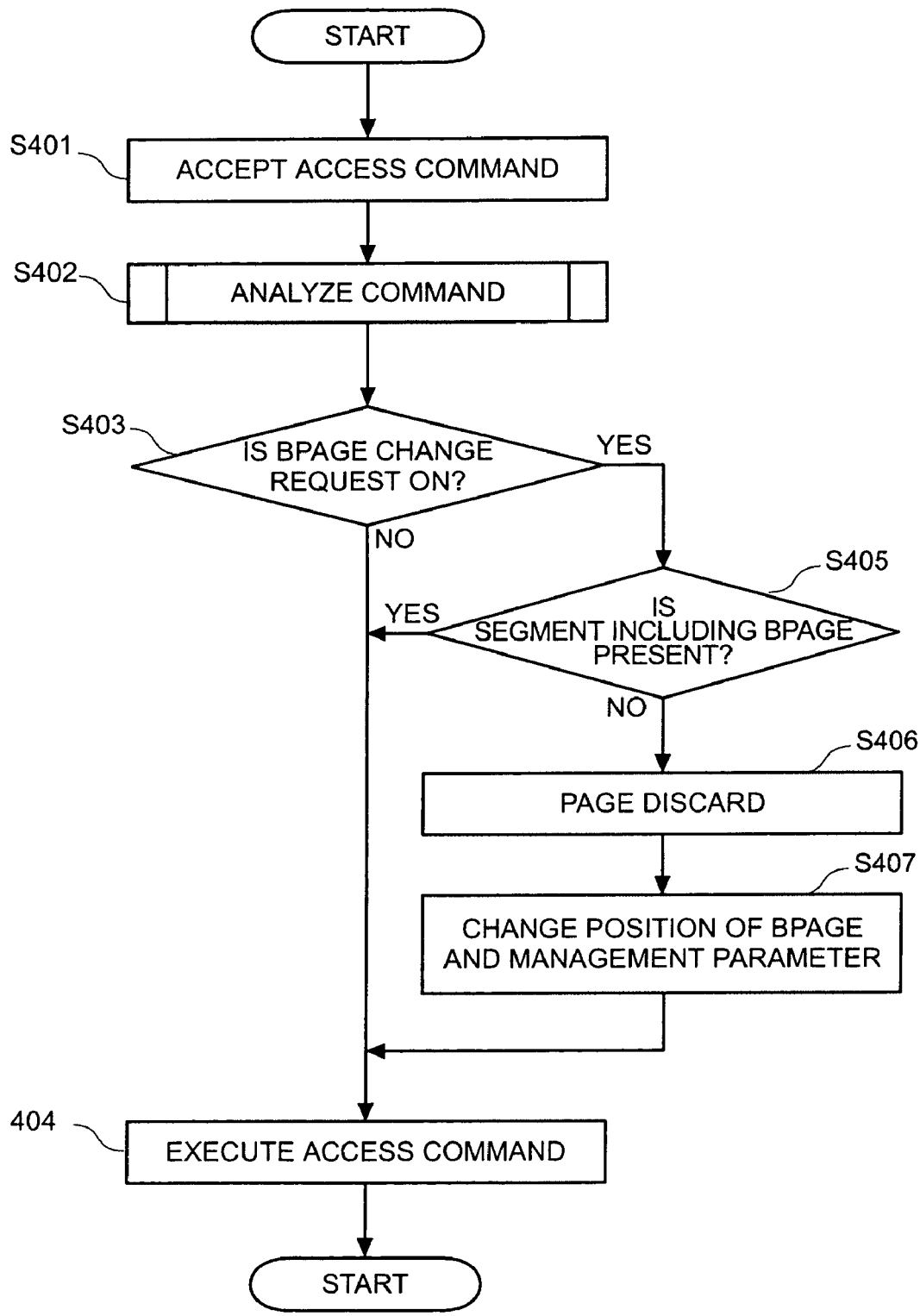
FIG. 4 is a flowchart for describing the flow of processing executed by the MPU according to the present embodiment.
Figure 5:
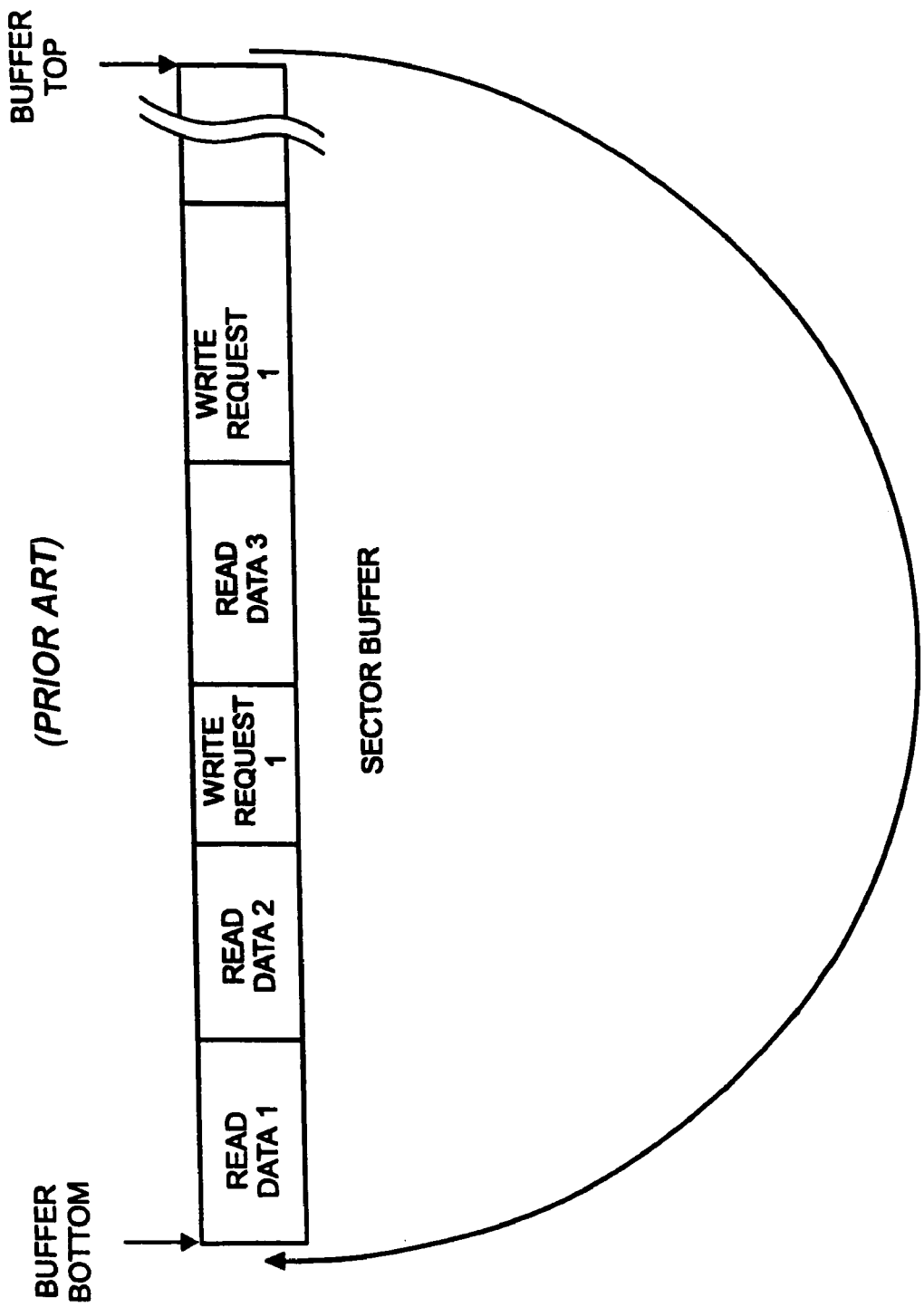
FIG. 5 is a conceptual diagram illustrating the configuration of a ring buffer.

FIG. 4 is a flowchart for describing the flow of a process executed by the MPU 109. When the hard disk drive 100 receives an access command from the host system and it transfers the access command from the HDC 110 to the MPU 109, as shown in FIG. 4 (Step 401), the command analyzer 60 first analyzes the access command. The MPU 109 judges based on the result of analysis whether the BPAGE 13 of the sector buffer 10 should be moved (Step 402). When it is determined that the BPAGE 13 is moved, a BPAGE change request indicative of a flag that a micro code refers to is brought to on.

Next, the segment control routine 30 checks for the state of the BPAGE change request of the access command. If the BPAGE change request is off, then the access command is executed as usual and the process is terminated (Steps 403 and 404).

On the other hand, if the BPAGE change request is on, then the BPAGE 13 is actually rewritten. At this time, it is necessary to take into consideration the access command in progress and the state of the sector buffer 10. That is, if the BPAGE 13 is not contained in the segment in the BUF_W 12, then the rewriting of the BPAGE 13 can be carried out. When, however, the BPAGE 13 is included in the segment in the BUF_W 12, the segment of the BUF_W 12 is affected by the rewriting of the BPAGE 13, so that the rewriting of the BPAGE 13 cannot be performed.

In specific operation, the command dispatcher 40 first issues a command for checking for a variable corresponding to num_pend wrt. This command is executed according to a predetermined routine. In accordance with the value of the num_pend wrt, the segment control routine 30 next checks whether the BPAGE 13 is included in a predetermined segment of write request (Step 405). Here, the term num_pend wrt is a variable indicative of the number of write requests for which writing into the magnetic disk 101 is not yet finished, while it is being held in the sector buffer 10.

If the value of the num_pend wrt is 0, then the segment for the write request for which the writing into the magnetic disk 101 is not yet finished does not exist. It is therefore unnecessary to retrieve the segment in the BUF_W 12 including the BPAGE 13. On the other hand, when the num_pend wrt is not 0, the corresponding segment including the BPAGE 13 is retrieved.

As a result of retrieval of the segment including the BPAGE 13, the BPAGE 13 cannot be rewritten if such a segment exists. Therefore, the access command is executed as usual and the process is terminated (Step 404).

Since the rewriting of the BPAGE 13 is enabled when the segment including the BPAGE 13 does not exist, a command for performing a PAGE Discard is first issued from the command dispatcher 40, and the PAGE Discard is executed according to a predetermined routine (Step 406). The PAGE Discard is a process for discarding a cache-unnecessary segment from the corresponding page. The cache-unnecessary segment is, for example, a segment including the write request that has already been written into the magnetic disk 101 from the write requests retained in the BUF_W 12.

Then the BPAGE 13 is rewritten by the segment control routine 30 so that its position is changed. With its change, management parameters for the BUF_R 11 and BUF_W 12 are changed (Step 407). Thereafter, the access command is executed as usual and the process is finished (Step 404).

The above operation is executed each time the hard disk drive 100 receives the access command from the host system. In the present embodiment, as indicated by the judgment at Step 405, even when it is found from the result of the command analysis that the BPAGE 13 is preferably moved to change the buffer sizes of the BUF_R 11 and BUF_W 12, the rewriting of the BPAGE 13 is awaited without performing its rewriting till the next opportunity (until the hard disk drive accepts another access command and starts up operation cycles of Step 401 and beyond), depending on the state of the sector buffer 10, i.e., where the write request's segment including the BPAGE 13 exists. This is because if the corresponding write request retained in the BUF_W 12 is executed as the normal process at the background of the hard disk drive 100, and the write request's segment including the BPAGE 13 becomes non-existent until the hard disk drive 100 accepts the next access command, then the rewriting of the BPAGE 13 is enabled.

In the present embodiment as described above, the sector buffer 10 is provided as the dual ring buffer system wherein the configuration of the sector buffer 10 is divided into the BUF_R 11 corresponding to the ring buffer for caching the read data, and the BUF_W 12 corresponding to the ring buffer for caching the write request issued from the host system. According to the access patterns from the host system to the hard disk drive 100 (magnetic disk 101), the buffer sizes of the BUF_R 11 and BUF_W 12 are changed in such a manner that when the number of write requests increases and its data size is large, the BUF_W 12 is expanded, and when the number of read requests increases and its data size is large, the BUF_R 11 is expanded. Since the buffer size of the whole sector buffer 10 has been determined, the position of the bottom page (BPAGE 13) of the BUF_R 11 or BUF_W 12, which corresponds to the partition for separating the BUF_R 11 from BUF_W 12 is changed to thereby change the buffer sizes of the BUF_R 11 and BUF_W 12.

Thus, the buffer size of the BUF_R 11 can be increased in much need of cache capacity for read data, and the buffer size of the BUF_W 12 can be increased in much need of cache capacity for a write request. Therefore, even if the dual ring buffer system is used as the data structure of the sector buffer 10, the influence that the individual buffer sizes used for caching of the write request and read data is reduced as compared with the single ring buffer system can be reduced.

According to the present invention as described above, degradation of the performance of a storage apparatus can be avoided even in the case of execution of access biased to writing or reading of data by adopting a dual ring buffer system as a data structure of a buffer memory.

What is claimed is:

1. A data storage apparatus, comprising:
a magnetic disk that magnetically records data;
a buffer memory that temporarily retains data read from and written on the magnetic disk prior to a process on the magnetic disk; wherein
the buffer memory includes a memory area divided into a first ring buffer that stores a write request to the magnetic disk accepted from outside, and a second ring buffer that stores data read from the magnetic disk, and said first ring buffer and said second ring buffer have respective buffer sizes that are varied by changing a position of a partition for separating the first ring buffer from the second ring buffer; and wherein
the partition of the buffer memory is shifted according to external access patterns to the magnetic disk.

2. The data storage apparatus of claim 1, wherein the partition is a bottom page of the first ring buffer or a bottom page of the second ring buffer.

3. A data storage apparatus, comprising:
a recording medium that records data;
buffer means having a first ring buffer that temporarily retains an external write request to the recording medium prior to a process on the recording medium, and a second ring buffer that retains data read from the recording medium according to an external read request to the recording medium; and
buffer control means that changes respective buffer sizes of the first ring buffer and the second ring buffer included in the buffer means according to external access patterns to the recording medium.

4. The data storage apparatus of claim 3, wherein the buffer means is a RAM in which a buffer area is divided into the first ring buffer and the second ring buffer.

5. The data storage apparatus of claim 3, wherein the buffer control means changes a position of a bottom page of the first ring buffer or the second ring buffer, which bottom page divides the buffer area of the RAM, to thereby change the respective buffer sizes of the first ring buffer and the second ring buffer.

6. The data storage apparatus of claim 3, wherein the buffer control means changes the respective buffer sizes of the first and second ring buffers, based on the type of each access request accepted from outside and frequency of the access requests for each type.

7. The data storage apparatus of claim 3, wherein the buffer control means changes the respective buffer sizes of the first and second ring buffers, based on the size of write data or read data related to an access request accepted from outside.

8. A method of managing a buffer memory that temporarily retains data prior to a process to a predetermined recording medium when the data is read from or written in the predetermined recording medium, the method comprising:
analyzing an external access request to the recording medium;
determining based on said result of analysis whether respective buffer sizes of a write request ring buffer and a read data ring buffer provided in a buffer area of the buffer memory should be changed; and
changing a position of a partition for dividing the buffer area of the buffer memory into the two ring buffers according to said determination to thereby change the respective buffer sizes of the two ring buffers.

9. The method of claim 8, wherein said step for analyzing the access request analyzes the type of the access request and frequency of the access requests for each type; and
said step for determining whether the buffer sizes should be changed, judges that the buffer sizes are changed in such a manner that the write request ring buffer is expanded when the number of write requests increases in the external access request, and judges that the buffer sizes are changed in such a manner that the read data ring buffer is expanded when the number of read requests increases in the external access request.

10. The method of claim 8, wherein said step for analyzing the access request analyzes the size of write data or read data related to the access request; and
said step for determining whether the buffer sizes should be changed, judges that the buffer sizes are changed in such a manner that the write request ring buffer is expanded when the number of access requests for writing large size data increases in the access request, and judges that the buffer sizes are changed in such a manner that the read data ring buffer is expanded when the number of access requests for reading large size data increases in the external access request.

11. The method of claim 8, wherein said step for changing the buffer sizes changes a position of a bottom page of the write request ring buffer or the read data ring buffer to thereby change the buffer sizes of the two ring buffers.

12. A hard disk recorder for recording and reproducing a multimedia content by use of a magnetic disk as a recording medium, comprising:

buffer means having a first ring buffer that temporarily retains a write request to the magnetic disk prior to a process on the magnetic disk, and a second ring buffer that retains data read from the magnetic disk according to a read request to the magnetic disk; and buffer control means that dynamically allocates a memory area of the buffer means in such a manner as to give a large buffer size to the first ring buffer when the hard disk recorder is operating in an operation mode for recording the multimedia content and to give a large buffer size to the second ring buffer when the hard disk recorder is operating in an operation mode for reproducing the multimedia content.

* * * * *